United States Patent [19]
Spiro

[11] Patent Number: 5,503,104
[45] Date of Patent: Apr. 2, 1996

[54] SYNTHETIC DIAMOND PRODUCT

[75] Inventor: Clifford L. Spiro, Niskayuna, N.Y.

[73] Assignee: General Electric Company, Schenectady, N.Y.

[21] Appl. No.: 411,181

[22] Filed: Mar. 27, 1995

[51] Int. Cl.⁶ ............................................. C30B 29/04
[52] U.S. Cl. .............................. 117/79; 117/929; 423/446
[58] Field of Search ....................... 117/79, 929; 423/446

[56] References Cited

U.S. PATENT DOCUMENTS

| | | |
|---|---|---|
| 2,941,244 | 6/1960 | Wentorf, Jr. et al. . |
| 2,947,034 | 8/1960 | Wentorf, Jr. . |
| 3,030,188 | 4/1962 | Eversole . |
| 3,271,502 | 9/1966 | Wentorf, Jr. . |
| 3,297,407 | 1/1967 | Wentorf, Jr. . |
| 3,745,623 | 7/1973 | Wentorf, Jr. et al. . |
| 4,034,066 | 7/1977 | Strong et al. ............................ 117/79 |
| 4,042,673 | 8/1977 | Strong ..................................... 117/79 |
| 4,287,168 | 9/1981 | Wentorf, Jr. et al. . |
| 5,273,730 | 12/1993 | Yoshida et al. ........................ 117/79 |
| 5,328,548 | 7/1994 | Tsuji et al. ............................. 117/79 |

FOREIGN PATENT DOCUMENTS

| | | |
|---|---|---|
| 464611 | 1/1992 | European Pat. Off. ................ 117/79 |
| 603995 | 6/1994 | European Pat. Off. ................ 117/79 |
| 61-151095 | 7/1986 | Japan . |
| 2239011 | 6/1990 | United Kingdom . |

OTHER PUBLICATIONS

Zengsun Jin, Xianyi Lu, Tiechen Zhang, and Guangtian Zou, "Synthesis of High–Pressure Diamond Using Graphite over Which CVD Diamond Grains Were Grown", Diamond Films And Technology, vol. 3, No. 4, 1994, MYU Tokyo.

*Primary Examiner*—Robert Kunemund
*Attorney, Agent, or Firm*—William H. Pittman

[57] ABSTRACT

A method produces a columnar, quasi-oriented diamond that exhibits the enhanced optical, thermal and mechanical properties of gem diamonds. This method allows diamond growth rates that are faster than those possible with high pressure diamond growth from a single diamond seed. The columnar, quasi-oriented diamond contains lower grain boundary density than chemically vapor deposited diamond.

14 Claims, No Drawings

SYNTHETIC DIAMOND PRODUCT

BACKGROUND OF THE INVENTION

This invention relates to a novel synthetic diamond article that combines the desirable characteristics of other diamond products, both synthetic and natural. More specifically, this novel diamond article exhibits the optical, mechanical and thermal properties of a gem diamond, while maintaining the high growth rates of chemically vapor deposited diamonds. This invention further relates to a novel method of producing a synthetic diamond article.

Synthetic diamond products of the prior an take many forms: mesh, sintered polycrystalline compacts, chemically vapor deposited polycrystalline diamond, and gems.

Mesh consists of fine, sand-like diamond crystals ranging in size from submicron to coarse 20 mesh. The crystals occur either as single crystals or in small multiple crystal clusters. Such materials include those marketed by the General Electric Company under the trade names MBS®, MGB® and RVG®.

Sintered polycrystalline compacts consist of diamond grains that have been sintered into disks by convening diamond powders through the action of a catalyst sweep at diamond-growing conditions. The sintered products contain small amounts of catalyst in pores. The microstructure is dependent on the grain size of the diamond feedstock. It is quasi-isotropic. Sintered products may be leached, leaving porous, catalyst-free material that is thermally stable.

Polycrystalline chemically vapor deposited (CVD) diamonds are dense, metal-free, and substantially non-porous. They are prepared by the energetic decomposition of hydrocarbonaceous species at low pressure. The microstructure is substantially columnar. Textures, flaws and defects are dependent on the processing used to generate the polycrystalline diamond.

Synthetic gems are single crystal products that are coarse, ranging in size from about 0.5 carats to greater than 50 carats. They are dense and generally free of defects. They can only be grown at very slow rates, however, making mass-production time-consuming and expensive.

In the present invention, the novel article can be grown at a relatively quick pace similar to that of CVD diamond, while exhibiting a minimal number of defects resulting in improved thermal, mechanical and optical properties similar to gem diamonds.

SUMMARY OF THE INVENTION

In accordance with the present invention, there is provided a method to produce columnar, quasi-oriented diamond comprising the steps of:
a. loading a growth cell with the following:
  i. polycrystalline CVD diamond,
  ii. catalyst, and,
  iii. a carbon source, and
b. applying
  i. heat sufficient to induce a temperature gradient across the growth cell so that the temperature within the growth cell is hottest at the carbon source and coolest at the polycrystalline CVD diamond, and,
  ii. pressure,
whereby the pressure and temperature throughout the growth cell are such that the resultant diamond is thermodynamically stable.

In another aspect of this invention, there is provided an article comprising columnar, quasi-oriented diamond produced in accordance with the method of the instant invention.

DESCRIPTION OF THE PREFERRED EMBODIMENT

The method of the present invention includes the steps of loading the growth cell with polycrystalline CVD diamond, catalyst and a source of carbon and then applying pressure and heat in such a way as to induce a temperature gradient across the growth cell. Pressures and temperatures throughout the growth cell are such that diamond is the thermodynamically stable form of carbon. The article of the instant invention comprises a columnar, quasi-oriented, diamond structure.

The article of the present invention is produced in a growth cell whose size and shape is defined by the apparatus that supplies the high pressure to the materials contained in the growth cell. The high pressure apparatus is any piece of equipment capable of inducing the necessary pressures to sustain diamond formation within the enclosed growth cell. It can include equipment used in the prior art method of high pressure diamond gem manufacture. Such an apparatus is capable of withstanding high pressures and high temperatures. This equipment is well known in the art. A typical apparatus is described in commonly assigned U.S. Pat. No. 3,297,407, which is incorporated herein by reference. Briefly, this apparatus includes an annular belt member having a convergent divergent aperture therethrough. A pair of frustoconical oppositely positioned and movable punches move into the opening to define a reaction chamber. A growth cell, containing specimen material, is placed in the reaction chamber and compression thereof through motion of the frustoconical punches subjects the sample material to high pressures. Many variations of such apparatuses have been disclosed. They include multi-piece dies with gaskets between individual segments, such as is described in commonly assigned U.S. Pat. Nos. 2,941,244 and 2,947,034, which are incorporated herein by reference. Other types of apparatuses include a given closed reaction chamber that is defined by a plurality of interfitting overlapping pressure resisting members all of which are in a sliding relationship. The arrangement provides a reduction in volume of the growth cell along more than two axes. Such an apparatus is detailed in commonly assigned U.S. Pat. No. 3,271,502, which is incorporated herein by reference.

Pressures within the growth cell typically range from about 5–7 GPa. The temperature is typically maintained at about 1300°–1800° C.

Heat can be supplied by any method known in the art, for example, electrical resistance heating can be employed to attain necessary temperatures. It is important that the heat be applied in such a manner as to produce a temperature gradient within the growth cell so that the growth cell is hottest at the carbon source and coolest at the polycrystalline CVD diamond. In this way, the metallic solvent is saturated with carbon when in contact with the carbon source and is supersaturated with carbon when in contact with the polycrystalline CVD diamond. There is, therefore, a driving force to dissolve, transport and redeposit diamond from the carbon source and onto the polycrystalline CVD diamond.

Polycrystalline CVD diamond is well known in the art. For use in the present invention, it can be produced by any method. Such methods include, but are not limited to, DC plasma, microwave plasma, and hot filament CVD techniques. The method of producing the polycrystalline CVD diamond is not critical to the present invention. Typically, a plate or disc of polycrystalline CVD diamond will be placed in the growth cell.

It is necessary that the polycrystalline CVD diamond have a multiplicity of surfaces in near proximity to each other. This ensures the new and unexpected results of the instant invention. Growth rates are faster than that observed on single crystalline seeds of diamond due to a plurality of growth surfaces and high surface area from which to generate diamond. In the prior art, a single diamond seed provided a single growth surface. The polycrystalline CVD diamond of the present invention has many growth surfaces, multiplying the amount of diamond generated at any one time. The other important feature of the present invention is that the growth surfaces are in near proximity to one another. The growth on each surface is affected by that of its neighbors. It is typical that different growth surfaces have different growth rates based on their local structural and chemical environments. As each surface grows, the crystal thickens and comes into contact with neighboring crystals. Only those crystals which grow at the highest rates continue to grow while those crystals which grow at the lowest rates will become overgrown by the faster growing crystals and terminate. As a result, the crystals are forced into columnar shapes, orienting themselves substantially parallel to neighboring crystals. The resulting quasi-oriented, columnar structure provides enhanced optical, mechanical and thermal properties due to the resulting low grain boundary density.

Suitable catalysts for high pressure diamond growth are well known in the art. They include metals such as iron, aluminum, nickel, cobalt, tantalum, manganese, chromium and alloys thereof.

Diamond growth is provided by dissolving diamond or carbon in molten catalyst and then precipitating diamond from the molten catalyst onto the polycrystalline CVD diamond. The carbon source necessary to the instant invention can be either diamond powder or graphite or amorphous carbon. Preferably, the carbon source is diamond powder, which eliminates the volume contraction encountered in the high-pressure conversion of graphite to diamond. The carbon source can also include isotopically pure diamond which is disclosed in British patent GB2239011. Such diamond consists of isotopically pure carbon-12 or carbon-13.

The fewer the number of grain boundaries within a diamond, the more gem-like the properties. The prior art methods of chemically vapor depositing diamond, while it can be grown relatively quickly, results in a multitude of grain boundaries and defects that lower thermal conductivity, optical brilliance and mechanical strength. Such diamond products cannot be used in applications that require the superior properties of the gem diamonds.

The instant invention, with its less defective and fewer grain boundaries, could be a cost effective replacement for gem diamonds in some applications because it provides a thicker and coarser grained diamond than chemically vapor deposited diamond. The diamond can be cut, diced or finished to a broader range of shapes than is currently feasible. It can be used to produce wire-drawing dies of large dimensions. Diamonds produced using the method of the present invention can be used as heat sinks in electronic applications, such as multi-chip modules, and in optoelectronic applications, such as laser diodes. Diamonds of the instant invention can be used as transparent windows in various applications. These diamonds can be incorporated into applications such as sensors and optics. Radomes for aircraft can also incorporate the article of the present invention. Numerous single or semi-single crystal wire dies, heat sinks, optics and radomes can be sliced from one plate of diamond generated by the instant invention. Diamond anvils for use in research can be prepared from the surface, as well as tools requiring precise orientation. Gems suitable for jewelry could also be obtained.

The following examples are presented to enable those skilled in the art to understand more clearly and practice the present invention. These examples should not be considered as a limitation upon the scope of the present invention, but merely as being illustrative and representative thereof.

EXAMPLE

A growth cell was assembled. The cell contained 445 mg of crushed diamond powder that had been prepared by microwave chemical vapor deposition. Beneath the crushed diamond powder, the following disks were placed in descending order: a 0.13 mm thick disk of cobalt foil, a 0.03 mm thick disk of titanium, a 0.5 mm thick disk of cobalt, a 5 mm thick alloy disk containing 95% by weight iron and 5% by weight aluminum, platinum foil and a polycrystalline CVD diamond disc that had been prepared by microwave plasma chemical vapor deposition that was 0.2 mm thick and 6.4 mm in diameter.

The growth cell was packed in salt and pressurized to approximately 6 GPa. A heat gradient was applied for 58 hours so that the diamond powder was held at 1270° C. and the polycrystalline CVD diamond disk was held at 1180° C. The sample was depressurized and cooled. It was then immersed in strong mineral acid. After several hours with some mechanical agitation, a diamond product was recovered.

The original CVD diamond microstructure was preserved considerably intact. The disk appeared gray-black, with remnant columnar and polycrystalline morphology. Emanating from the surface of the polycrystalline CVD diamond were massive, substantially oriented and transparent diamond structures several millimeters thick.

What is claimed is:

1. A method to produce columnar, quasi-oriented diamond comprising the steps of:
   a. loading a growth cell with the following:
      i. polycrystalline CVD diamond comprised of a plurality of crystals in close enough contact with each other that as each crystal grows it comes into contact with neighboring crystals,
      ii. catalyst, and,
      iii. a carbon source, and
   b. applying
      i. heat sufficient to induce a temperature gradient across the growth cell so that the temperature within the growth cell is hottest at the carbon source and coolest at the polycrystalline CVD diamond, and,
      ii. pressure,
   whereby the pressure and temperature throughout the growth cell are such that the resultant diamond is thermodynamically stable.

2. A method in accordance with claim 1, wherein said catalyst is selected from the group consisting of iron, aluminum, nickel, cobalt, tantalum, manganese, chromium and alloys thereof.

3. A method in accordance with claim 1, wherein said carbon source comprises graphite.

4. A method in accordance with claim 1, wherein said carbon source comprises diamond.

5. A method in accordance with claim 4, wherein said diamond comprises isotopically pure diamond.

6. A method in accordance with claim 1, wherein said polycrystalline CVD diamond is produced by a method selected from the group consisting of DC plasma, microwave plasma, and hot filament chemical vapor deposition.

7. A method in accordance with claim 1, wherein said pressure is about 5 to 7 GPa and said temperature is about 1300° to 1800° C.

8. An article comprising columnar, quasi-oriented diamond produced in accordance with the method of claim 1.

9. A wire-drawing die comprising an article in accordance with claim 8.

10. A heat sink comprising an article in accordance with claim 8.

11. A window comprising an article in accordance with claim 8.

12. A radome comprising an article in accordance with claim 11.

13. A diamond anvil comprising an article in accordance with claim 8.

14. A gem comprising an article in accordance with claim 8.

* * * * *